US012617026B2

(12) United States Patent
Merello

(10) Patent No.: US 12,617,026 B2
(45) Date of Patent: *May 5, 2026

(54) OVERHEAD DRILL AND ANCHOR PRESS

(71) Applicant: Peter Justin Merello, Las Vegas, NV (US)

(72) Inventor: Peter Justin Merello, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,037

(22) Filed: Jan. 16, 2024

(65) Prior Publication Data

US 2024/0300030 A1 Sep. 12, 2024

Related U.S. Application Data

(63) Continuation-in-part of application No. 17/117,036, filed on Dec. 9, 2020, now Pat. No. 11,890,737.

(51) Int. Cl.
B23B 39/14 (2006.01)
(52) U.S. Cl.
CPC .................................. B23B 39/14 (2013.01)
(58) Field of Classification Search
CPC B23B 39/14; B25H 1/0035; B25D 2250/275; B25D 17/32
USPC ........ 227/64, 69, 99, 140, 107, 156; 173/84, 173/29, 30, 31, 38, 39, 45, 50, 52, 81, 173/141, 213, 171
See application file for complete search history.

(56) References Cited

U.S. PATENT DOCUMENTS

| | | | | | |
|---|---|---|---|---|---|
| 2,168,905 | A | * | 8/1939 | Lear | E21B 7/028 |
| | | | | | 280/103 |
| 2,669,135 | A | * | 2/1954 | Moore | B23Q 1/267 |
| | | | | | 408/128 |
| 3,173,315 | A | * | 3/1965 | Fuldner | G05B 19/373 |
| | | | | | 91/170 R |
| 3,399,734 | A | * | 9/1968 | Folinsbee | E21B 7/023 |
| | | | | | 173/28 |
| 4,052,132 | A | * | 10/1977 | Oates | B28D 5/021 |
| | | | | | 408/1 R |
| 4,090,803 | A | * | 5/1978 | Haley | B23B 39/165 |
| | | | | | 408/46 |
| 4,694,930 | A | * | 9/1987 | Kishi | B66F 11/046 |
| | | | | | 182/2.11 |
| 5,060,532 | A | * | 10/1991 | Barker | B25J 17/0275 |
| | | | | | 901/18 |
| 5,117,544 | A | * | 6/1992 | Kousaku | G05B 19/182 |
| | | | | | 29/DIG. 56 |

(Continued)

FOREIGN PATENT DOCUMENTS

CN 114472958 A * 5/2022 ............. B23B 41/00
*Primary Examiner* — Robert F Long

(57) ABSTRACT

The Overhead Drill and Anchor Press is a single mobile mechanism designed for installation of anchors into a construction surface which is overhead and out of reach of the installer. The overhead drill and anchor press may include a mast, a turret assembly, a controller, and at least one drill. The overhead drill and anchor press can execute the anchor installation sequence automatically or manually with a controller by moving the drill position to drill the hole and set the anchor. The controller may be equipped with a digital display of the turret mounted camera for monitoring the process from the ground. The entire assembly may be manually pushed between target.

18 Claims, 13 Drawing Sheets

(56) References Cited

U.S. PATENT DOCUMENTS

| | | | | | |
|---|---|---|---|---|---|
| 5,803,550 | A | * | 9/1998 | Watson | E21C 25/02 |
| | | | | | 299/37.3 |
| 5,960,531 | A | * | 10/1999 | Mora | B23Q 3/069 |
| | | | | | 108/4 |
| 6,254,317 | B1 | * | 7/2001 | Chang | B25J 9/026 |
| | | | | | 408/46 |
| 6,315,059 | B1 | * | 11/2001 | Geldean | E21B 7/028 |
| | | | | | 173/147 |
| 6,460,652 | B1 | * | 10/2002 | Piipponen | E21B 7/026 |
| | | | | | 182/2.11 |
| 6,523,245 | B2 | * | 2/2003 | Whiten | B23P 23/00 |
| | | | | | 29/524.1 |
| 7,369,916 | B2 | * | 5/2008 | Etter | B23Q 17/24 |
| | | | | | 700/180 |
| 9,327,375 | B2 | * | 5/2016 | Yamane | B23Q 5/048 |
| 11,224,951 | B2 | * | 1/2022 | Oberoi | B64C 1/069 |
| 11,364,639 | B2 | * | 6/2022 | Seo | B25J 11/00 |
| 2009/0003955 | A1 | * | 1/2009 | Nakagawa | B23Q 5/06 |
| | | | | | 409/234 |
| 2012/0247836 | A1 | * | 10/2012 | Wilson | E21D 20/003 |
| | | | | | 175/203 |
| 2013/0228377 | A1 | * | 9/2013 | Kuittinen | B60L 1/003 |
| | | | | | 173/27 |
| 2013/0319765 | A1 | * | 12/2013 | Piipponen | E21B 7/02 |
| | | | | | 175/84 |
| 2014/0014609 | A1 | * | 1/2014 | Stakor | B66C 13/18 |
| | | | | | 212/276 |
| 2014/0037415 | A1 | * | 2/2014 | Zuritis | E02F 3/42 |
| | | | | | 29/428 |
| 2018/0326507 | A1 | * | 11/2018 | Halvorsen | B25J 9/1679 |
| 2021/0379767 | A1 | * | 12/2021 | Kang | B25J 11/0055 |

* cited by examiner

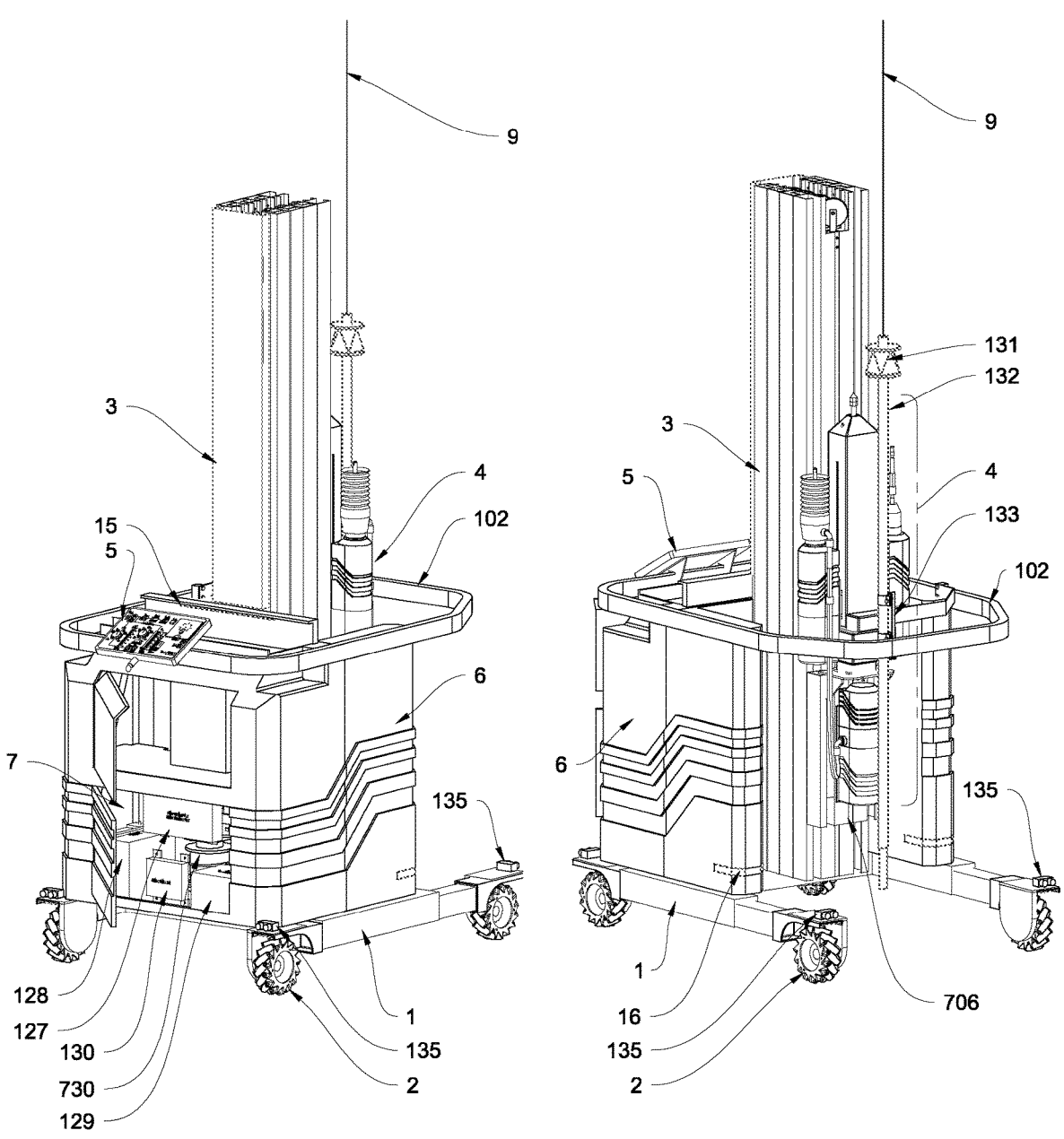
FIG. 1A  FIG. 1B

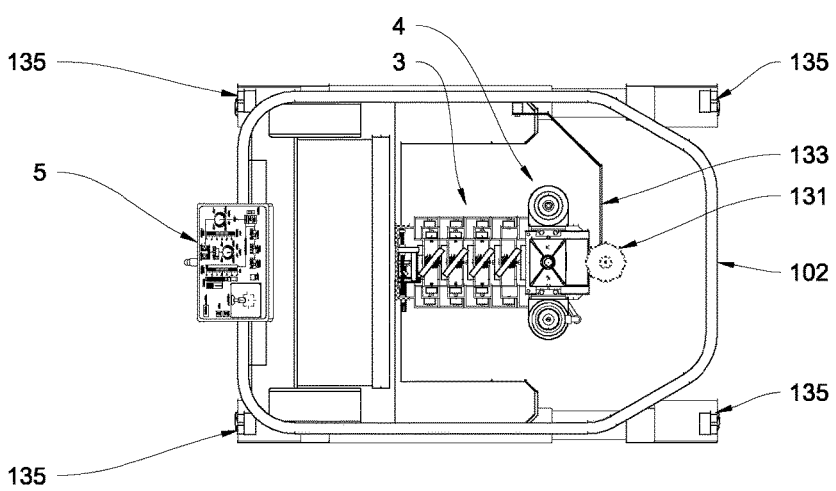
FIG. 5
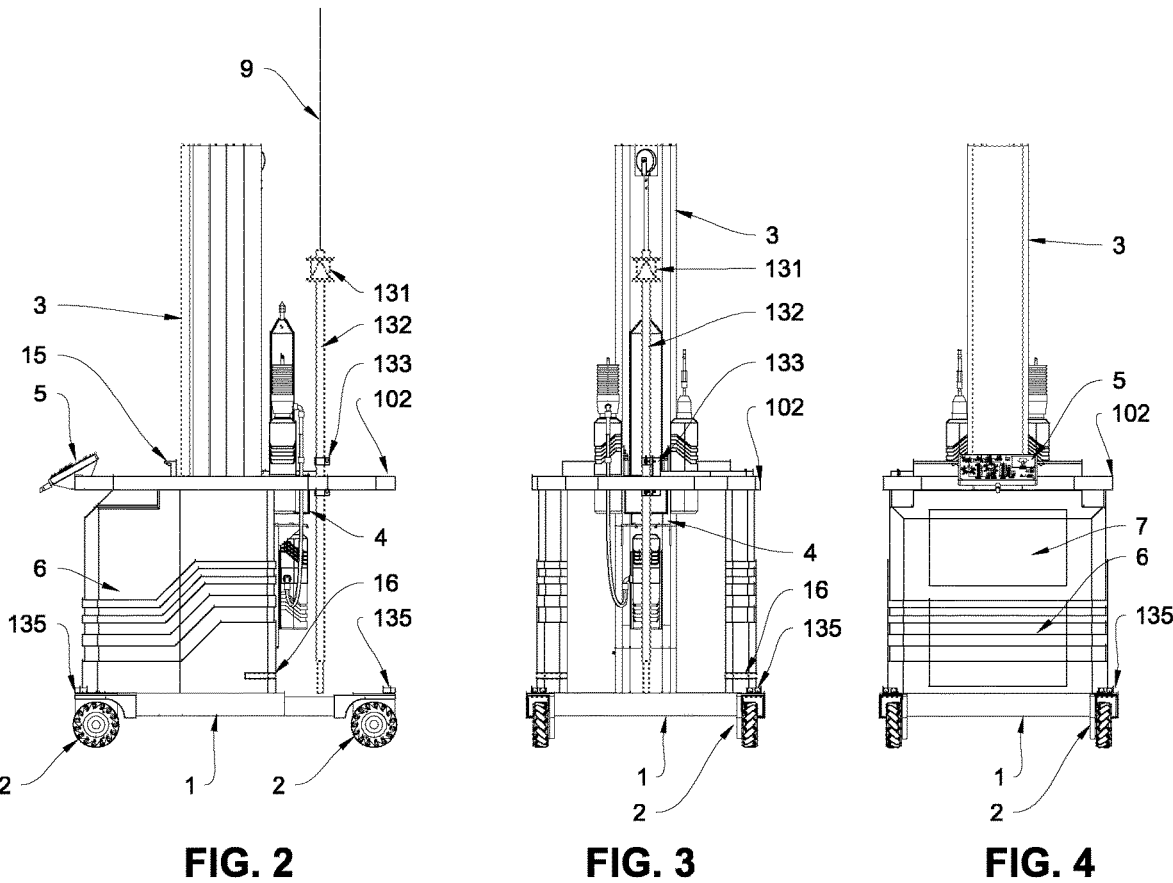
FIG. 2          FIG. 3          FIG. 4

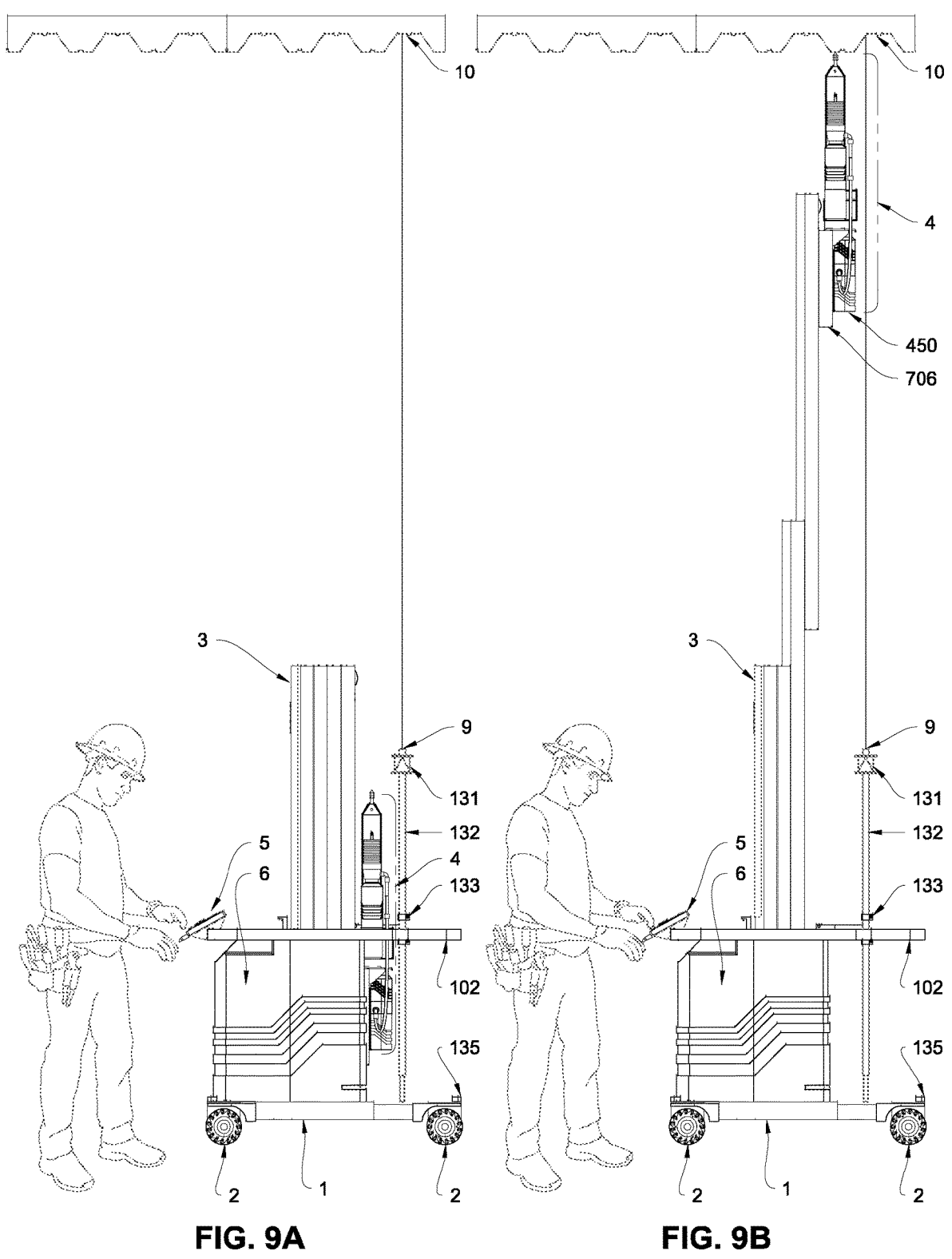
FIG. 9A FIG. 9B

OPERATION MODE BLOCK DIAGRAM

716

701

731

730

740

733

741

736

734

742

736

710

709

708

707

706

3

DRIVE DIAGRAM ⌐ 202

FORWARD
ALL WHEELS FORWARD SAME SPEED

REVERSE
ALL WHEELS REVERSE SAME SPEED

RIGHT SHIFT
WHEELS "A" & "D" FORWARD : WHEELS "B" & "C" REVERSE

LEFT SHIFT
WHEELS "B" & "C" FORWARD : WHEELS "A" & "D" REVERSE

CLOCKWISE TURN
WHEELS "A" & "C" FORWARD : WHEELS "B" & "D" REVERSE

COUNTER CLOCKWISE TURN
WHEELS "B" & "D" FORWARD : WHEELS "A" & "C" REVERSE

OVERHEAD DRILL AND ANCHOR PRESS

RELATED APPLICATION DATA

This application is a, continuation-in-part of U.S. patent application Ser. No. 17/117,036, filed on Dec. 9, 2020, which is in turn a continuation-in-part of U.S. patent application Ser. No. 16/285,005, filed on Feb. 25, 2019, which is in turn a continuation of patent application Ser. No. 14/884, 764, filed Dec. 28, 2015, and issued as U.S. Pat. No. 10,245,745 B2 on Apr. 2, 2019; these applications are incorporated herein the entirety.

FIELD OF THE INVENTION

The present invention pertains to power tools used in the field of construction, particularly a composition of tools onto a single mobile mechanism needed for installation of anchors into concrete and/or non-concrete surfaces overhead out of reach of the installer.

BACKGROUND OF THE INVENTION

In the field of construction, the conventional method of drilling overhead to install anchors for support of overhead equipment, building components, and utilities would start by elevating a person to within reach of the surface for the anchor to be installed. Outfitted with the proper personal protective equipment, eye protection, ear protection, and respiratory protection, the installer would use a drill and drill bit capable of penetrating the surface to a prescribed depth, followed by installing the anchor, and using an additional set of tools to properly set the anchor before attaching the load. The most commonly use tool for drilling into the surface is the rotary hammer commonly known as a "hammer drill". With this tool, which has weight of its own, requires the worker to apply additional upward force to activate the hammering action of the tool. The consistent force applied by the worker must be maintained against the surface as the drill advances. The "hammer drill" by nature, also reverberates through the workers hands from the percussive action which must also be overcome through the physical strength all the while generating harmful silica dust that should be avoided. In addition to the physical aspect of this work the users access the work surface by standing on a ladder or lift, putting the worker at additional risk of injury. This activity is generally performed many times on a project resulting in tremendous stress and strain on a worker's muscles, joints, and tendons, resulting in unsafe conditions and loss of time and production due to fatigue and injuries.

The layout and identifying of locations of the drilled holes and anchors have evolved in the industry today. The traditional method of identifying locations would be to hand measure from control lines with tape measure and marking the point on the ground or floor. This method is time consuming and can lose additional accuracy when transferring the mark to the surface to be drilled. Today, with the use of cad software, virtual 3D modeling of the building, building components, and utilities within, have become common in the industry. With this virtual building information model (also known as "BIM"), the hole and anchor locations can be preplanned and imbedded with X, Y, Z coordinates relative to the building itself. GPS and Laser measuring tools are an industrial standard in construction and integrating the BIM modeled points have become the most effective method for point layout at all stages of the construction process.

SUMMARY OF THE INVENTION

The purpose of this invention is to provide an operator with an apparatus and system of all tools and components into one robotic device needed to drill a hole or drill a hole and install an anchor into overhead surfaces. The solution for drilling holes overhead is accomplished by configuring a drill loaded with the appropriate drill bit to a telescopic lift. Mitigating the airborne silica dust generated from drilling a hole into concrete is accomplished by incorporating a dust collector with the means to catch and contain said dust. A second drill loaded with the appropriate setting tool and anchor to the telescopic mast provides an anchor setting solution. The present invention combines these three components drill #1, drill #2, and a dust collector into a single robotic turret mounted to a telescopic mast for lifting the assembly into reach of the working surface. Integration of the current industry methods of point layout is provided by configuring the cart with a mounting means for a prism to be used for location tracking by a "Total Station". Motorized omnidirectional wheels are incorporated into the cart frame design for the purpose of self-navigating the present Overhead Drill and Anchor Press invention throughout and about the project. This invention is also-designed to carry all the necessary equipment needed for this installation process and easily move between target locations, manually or autonomously using motorized wheels and sensors mapping its surroundings. The Overhead Drill and Anchor Press is designed to execute its drill or drill and install anchor sequence automatically or manually with an on-board controller.

The installation of an anchor generally requires a layout of locations which is easily done along the floor placing a mark where the anchor is to be located above. The Overhead Drill and Anchor Press is equipped with a laser that points down (for aligning to a mark on the floor) and up respectively to show that place on the surface above.

The Overhead Drill and Anchor Press has a telescopic mast which is designed to extend straight up carrying the tools needed for drilling a single hole or drilling a hole and pressing and setting the anchor into said hole. The telescopic mast is extended and retracted by a cable through a system of pulleys and cable drum operated by a gear motor mounted to the base of the mast. This operation is one of the sequencing steps initiated by the controller.

The present invention is equipped with a turret mounted to the top of the telescopic mast which operates the 2 drills attached to either side and is equipped with a laser and a camera. The first drill is loaded with the appropriate drill bit and programmed for drilling into the surface. The second drill is loaded with the appropriate setting tool and anchor and programmed to press the anchor into the hole and set the anchor by rotatory torque or percussion depending on the requirements of the anchor.

In one embodiment, a drill may be loaded with the appropriate drill bit and used to drill into the surface and to press the anchor into the hole, and then loaded with the appropriate setting tool and anchor and programed to press the anchor into the hole and set the anchor.

The cart is equipped with casters or motorized wheels for easy movement and is compartmentalized for protection of the power supply system, the electronics, and the gear motor and braking system with a sturdy top and floor base for carrying a supply of anchors needed for the project.

Further objects, features, and advantages of the present invention over the prior art will become apparent from the detailed description which follows, when considered with the figures provided herein.

DESCRIPTION OF THE DRAWINGS

FIG. 1A is an isometric view with the compartment doors in the open position. View is looking at the right rear.

FIG. 1B is an isometric view with the compartment doors in the open position. View is looking at the right front.

FIG. 2 is an elevation view of the right side of the overhead drill and anchor press.

FIG. 3 is an elevation view of the front of the overhead drill and anchor press.

FIG. 4 is an elevation view of the back of the overhead drill and anchor press.

FIG. 5 is a plan view of the top of the overhead drill and anchor press.

FIG. 9A is an elevation view of the right side of the overhead drill and anchor press in operation mode at the perched position with the laser on for sighting the target.

FIG. 9B is an elevation view of the right side of the overhead drill and anchor press in operation mode "sequence 1" showing the mast extended to contact the pilot tip to the construction surface above.

DETAILED DESCRIPTION OF THE INVENTION

Figure 6:
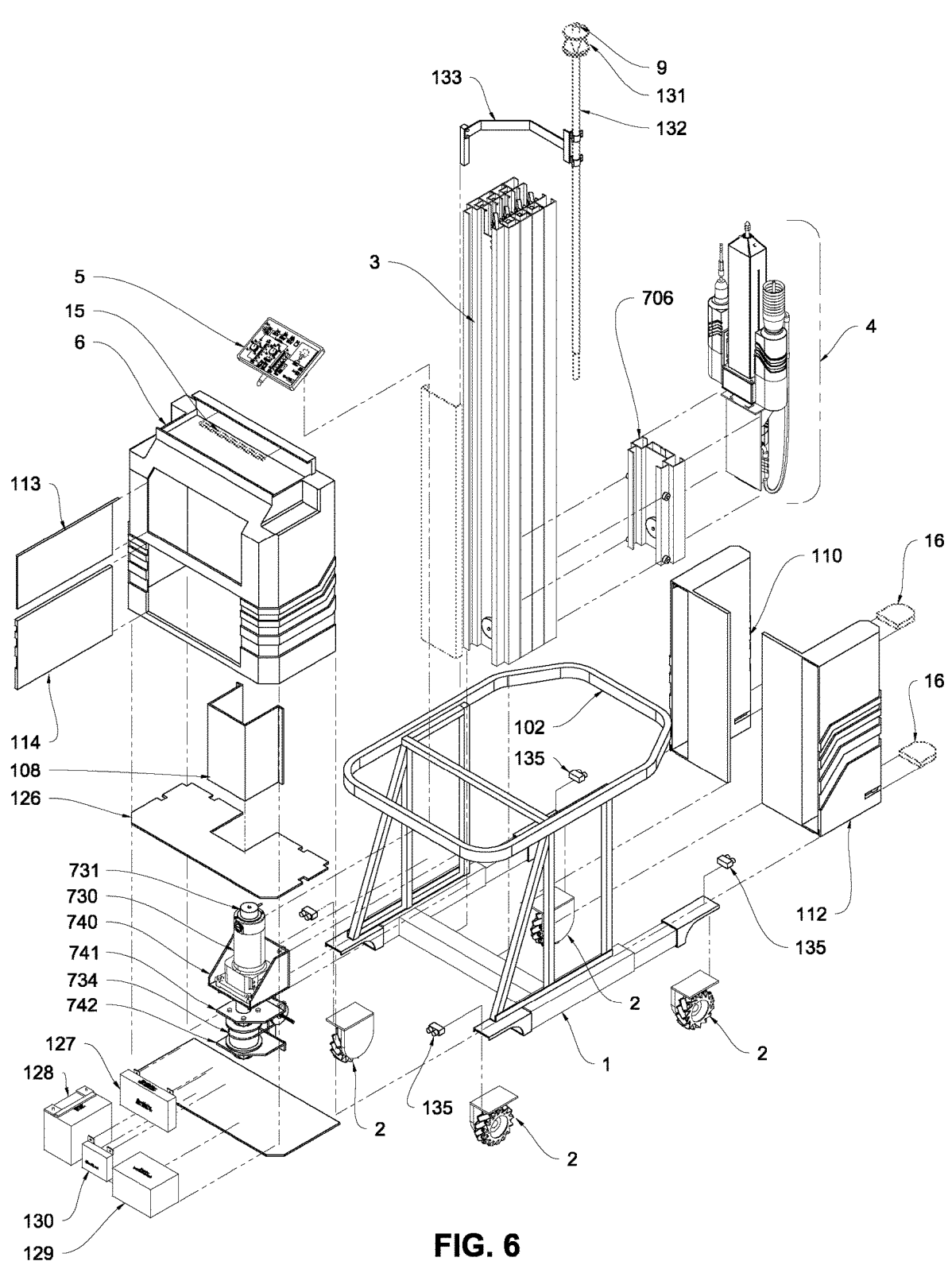
FIG. 6 is an exploded view of the preferred embodiment of the overhead drill and anchor press.

In the following description, numerous specific details are set forth in order to provide a more thorough description of the present invention. It will be apparent, however, to one skilled in the art, that the present invention may be practiced without these specific details. In order instances, well-known features have not been described in detail so as not to obscure the invention.

FIG. 1A and FIG. 1B are isometric views showing the preferred embodiment of the overhead drill and anchor press and includes these major components: a compartmentalized cart on casters 1, a telescopic mast 3, a turret assembly 4, a controller 5, an air reservoir tank 125, a battery 128, a battery charger 129, and a DC power supply 127. The entire assembly of the embodiment of the overhead drill and anchor press is designed to be manually pushed between target locations and sized to fit through standard framed door openings on a construction project.

FIG. 6 is an exploded view of the preferred embodiment of the Overhead Drill and Anchor Press of the present invention. This view illustrates the exploded components of the cart and placement of the major components: the telescopic mast 3, the turret assembly 4, the controller 5, the gear motor 730, the battery 128, the battery charger 129, and the DC power supply 127. The cart chassis framing 101 is wielded light weight metal and offers the support to all before mentioned major components. The cart handrail 102 is fixed to the cart chassis framing 101. The cart handrail 102 has rounded corners for handling and is shaped so that the controller 5 may be placed at any location along the straight sections (see FIG. 8A controller bracket 501). The chassis wheels 2 are heavy duty, swivel, polyurethane casters or motorized omnidirectional and fixed to the chassis framing 101. The rubber bumpers 117 are attached for protection of the operator's ankles and surrounding construction objects that the cart 1 may come in contact with. Each of the cart floor panels 126 and compartment segments 6, are constructed of light weight material strong enough to support objects placed on them and are affixed to the cart chassis framing 101. A clear space is left between cart base so that the laser down 8 (FIG. 2) may pass the cart 1 to the floor for targeting and the led lights 16 fixed to the cart 1 illuminate the floor surface for better visibility. Each of the compartment segments 6, 108, 110, 112 and door panels 113,114 are constructed of strong light weight material and affixed to the cart chassis framing 101.

In FIG. 6 of the present invention the telescopic mast assembly 3 is secured to the cart chassis framing 101.

The preferred embodiment of overhead drill and anchor press includes these powered components: [(FIG. 6) controller 5, DC power supply 127, battery charger 129, onboard controller 130, mast gear motor 730], [(FIG. 7) stepper motor #1 401, stepper motor #2 402, stepper motor #3 403, drill #1 430, drill #2 434, laser 413, and turret mounted camera 17 and led lights 15, and 16 The above listed components are powered by the (FIG. 6) onboard controller 5. The onboard controller is configured with a selection switch by which the operator can choose between an AC power source or the onboard battery 128. DC power supply 127, is configured to draw its power from a standard AC 120-volt outlet and converts to DC 24 volts to power the Overhead Drill and Anchor Press when the selection switch is in the AC power mode. When the selection switch is in the AC power source mode it is also configured to energize the battery charger 129 for charging the battery 128

Figure 7:
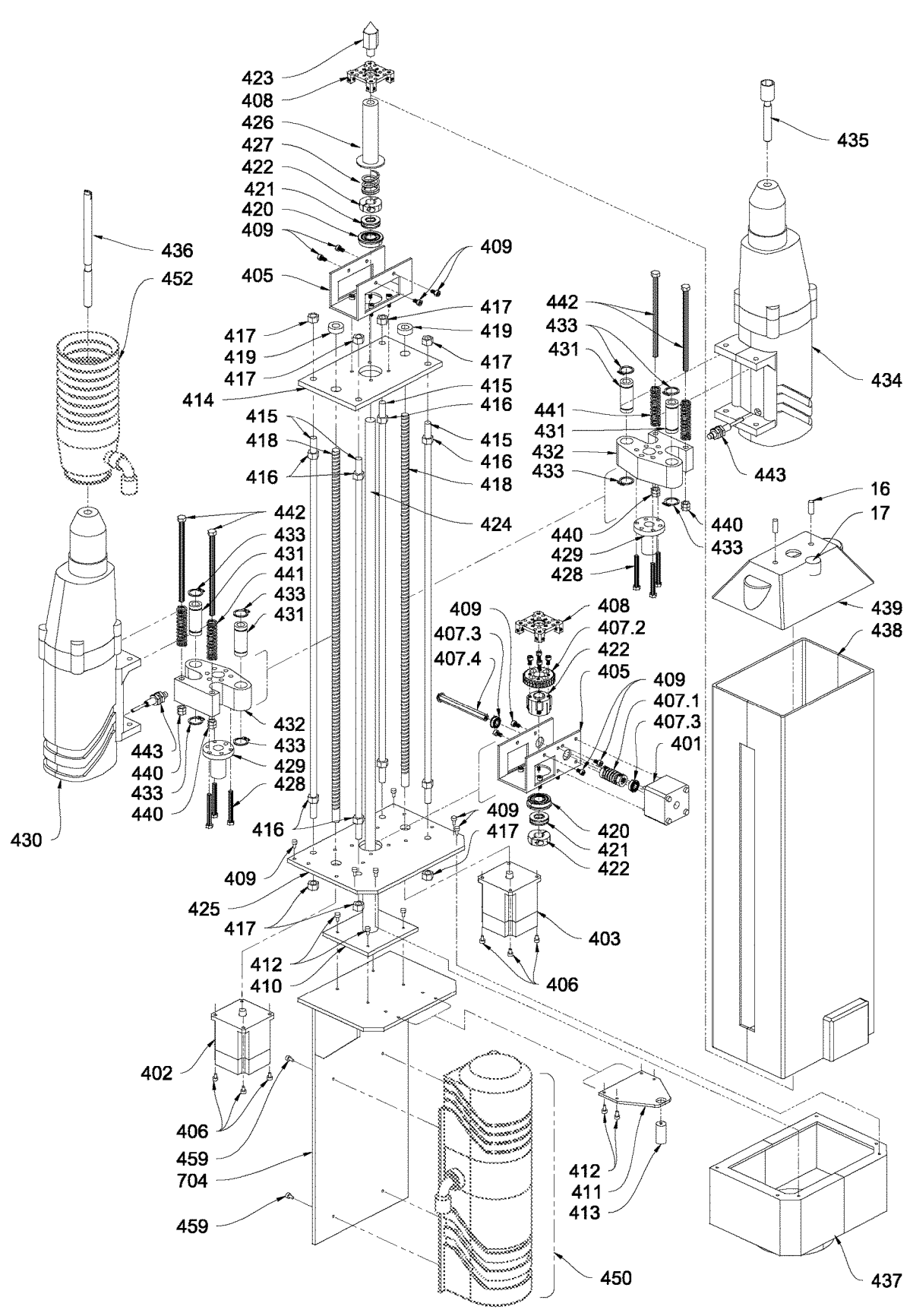
FIG. 7 is an exploded view of the preferred embodiment of the turret component to the overhead drill and anchor press.

FIG. 7 is an exploded view of the preferred embodiment of the turret component to the overhead drill and anchor press. The main shaft 424 has a solid connection to the main shaft mounting plate 410. The base plate 425 and all components mounted to it are designed to rotate around the main shaft 424. The linear guide shafts 415 are solid mounted to the base plate 425 with a threaded top for attaching the top plate 414. The ball screws 418 are held in place to the base plate 425 through the ball screw bearing 429 and the top plate 414 with the ball screw lock nut. The holes in the top plate 414 that receive the ball screws 418 are bearinged for ball screw 418 rotation.

In FIG. 7 the turret's rotational movement about the main shaft 424 is achieved mechanically by a worm gear assembly 407 and stepper motor #1 401. This stepper motor #1 401 is coupled to the shaft 407.4 and affixed to the mounting channel 405 which is then mounted to the base plate 425. The worm gear assembly shaft 407.4 is held in place through the flanged bearings 407.3 and drives the worm screw 407.1—which is meshed with the gear 407.2. This gear 407.2 is fixed to the shaft clamp 422 so that the rotation of the worm screw 407.1 turns the base plate 425 about the main shaft 424 for positioning of the drills during operation.

The stepper motor #2 402 and stepper motor #3 403 are affixed to the base plate 425 and connected to their respective ball screw 418. The ball screw 418 drives the carrier 432 which fixed to a ball screw nut 429 and guided by two sets of linear bearings (carrier bearings 431) held in place of the carriers 432 by their snap rings 433 for smooth linear movement along the linear guide shafts 415.

The two drills, drill #1 430 and drill #2 434, are standard drills capable of these functions separately: drill, hammer, and hammer drill. These drills have no handle but have been designed to be attached to the carriers 432 and have a plug for wiring connection to the controller thru the cord 503 see FIG. 8A, FIG. 8B (wire and wiring connections are not shown in the attached drawings).

In FIG. 7 of the present invention the turret component has three sections of protective cover constructed of light weight material designed to keep dust and debris out of the moving parts of this assembly. The turret top cover 439 is one piece with an opening on the top for the pilot to pass through and configured with led lights 16 for illuminating the surface above and camera 17. The turret base upper cover 438 with openings and dust covers on either side to allow for the carriers 432 to travel up and down and turret base lower cover 437 can be split into two sections for securing to base plate 425.

Figure 8A:
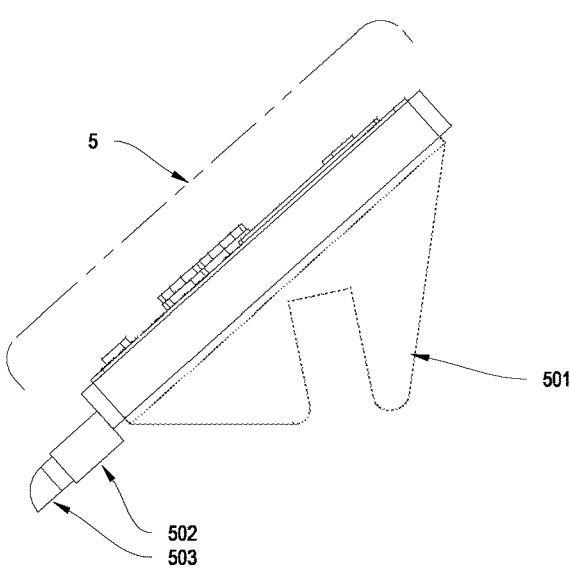
FIG. 8A is an enlarged side view of the preferred embodiment of the controller unit to the overhead drill and anchor press.
Figure 8B:
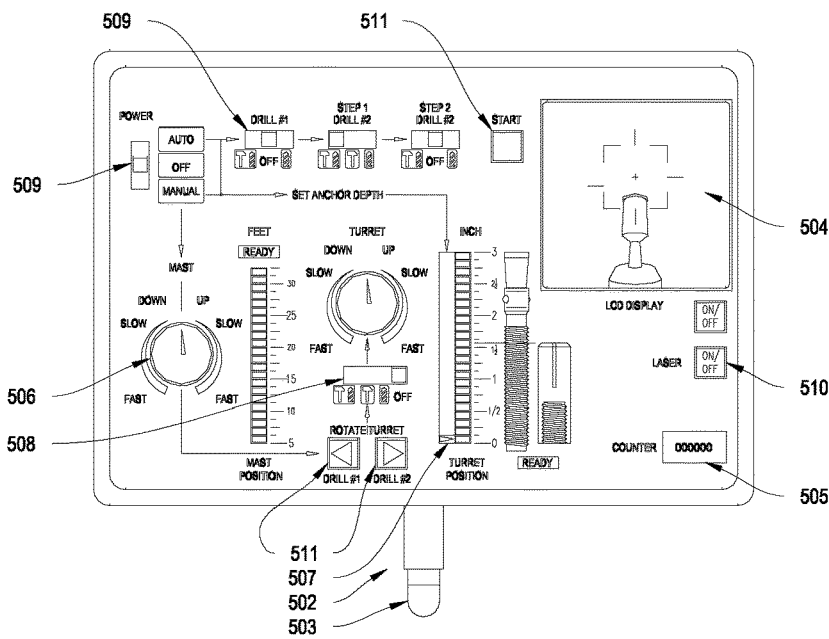
FIG. 8B is an enlarged top view of the preferred embodiment of the controller unit of the overhead drill and anchor press.
Figure 8C:
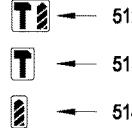
FIG. 8C is the controller unit symbol legend.
Figure 11:
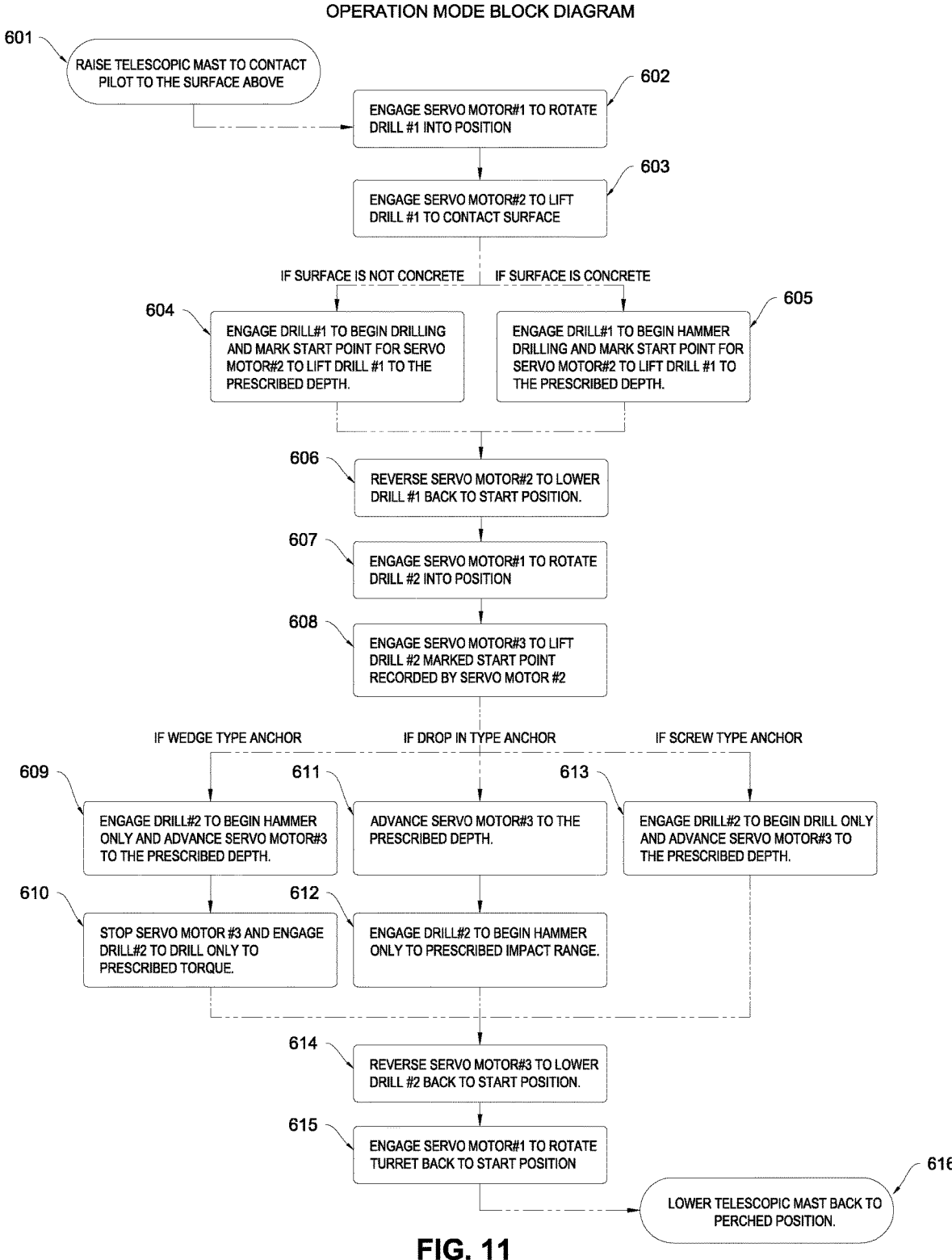
FIG. 11 is the operation mode block diagram of the operating sequence for the overhead drill and anchor press.

FIGS. 8A and 8B the overhead drill and anchor press is equipped with a controller 5. The controller 5 is an interface module between the human operator and the onboard controller 130 known as the HMI or (Human Machine Interface). The handheld controller 5 is capable of selecting between automatic mode and manual mode. In either mode the operator may select each drill's operating mode based on the type of surface and anchor type to be installed. If the operator has selected AUTO mode then the operator will need to make the selections for both drill operations and the anchor depth (with the slide switch 507) before pressing the start button 511. FIG. 8C is the symbol legend for the controller. FIG. 11 is the operation mode block diagram which illustrates the sequence of operations programmed to the controller in AUTO mode.

FIG. 8B the controller also has the manual mode selection. If the operator selects the manual mode, then the operator will need to process each sequence using the rotary switches 506, selector switch 508, and momentary switches 511. The handheld controller 5 is also configured with an LCD screen 504 for displaying the view from the camera 17 which is located on the turret referenced in FIG. 7 at the top. FIG. 11 is the operation mode block diagram which illustrates the sequence of operations that will be controlled manually with the controller in MANUAL mode.

FIG. 9A is an elevation view of the right side of the overhead drill and anchor press in operation mode at the perched position with the laser on for sighting the target. FIG. 9B is an elevation view of the right side of the overhead drill and anchor press in operation mode "sequence 1" showing the mast extended to contact the pilot tip to the construction surface 10 above.

Figures 10A, 10B, 10C, 10D, 10E, 10F:
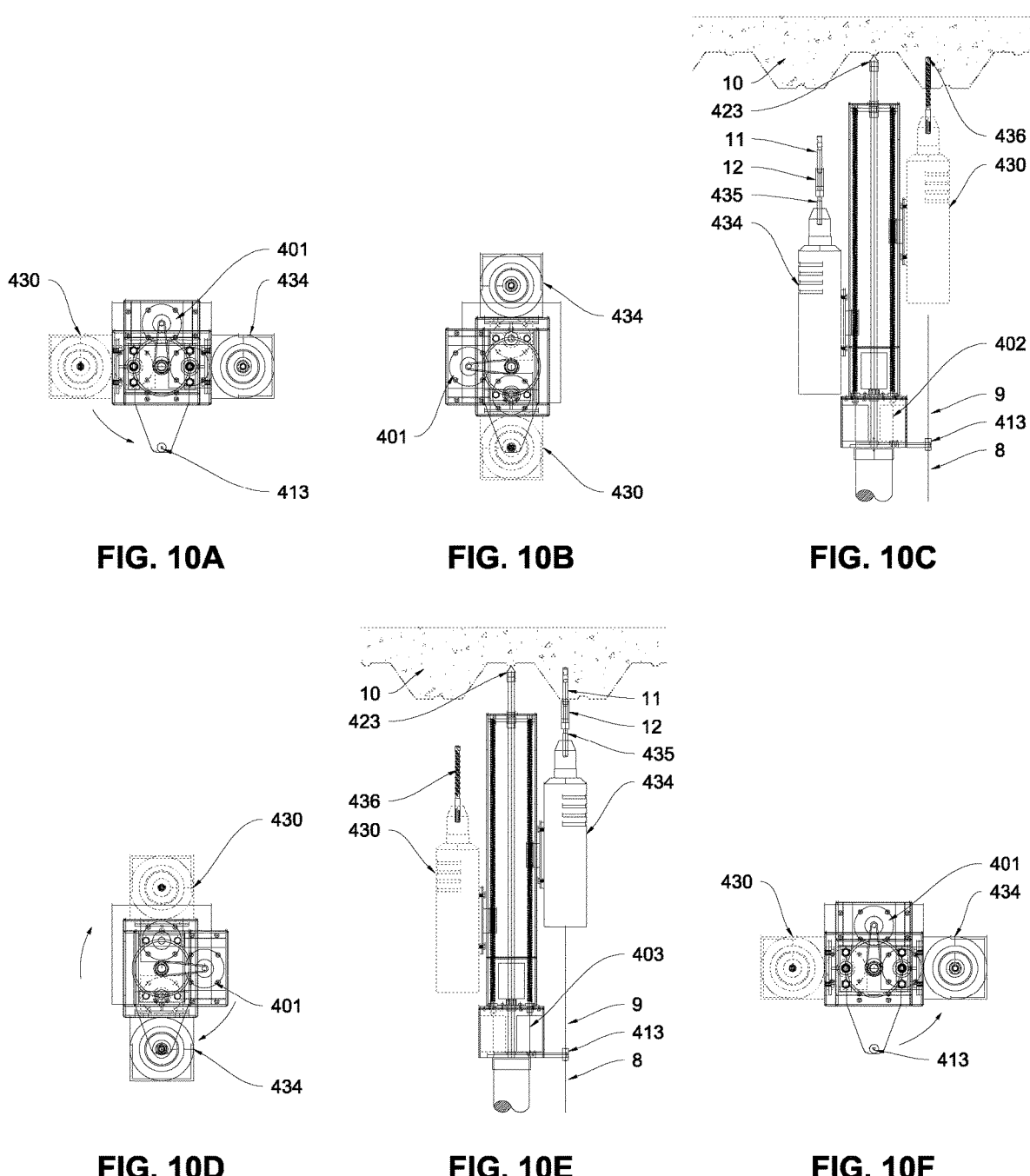
FIG. 10A is an enlarged top view of the turret in operation mode in the turret start position with the laser in position of the target.
FIG. 10B is an enlarged top view of the turret in operation mode at "sequence 2" with the drill #1 in position of the target.
FIG. 10C is an enlarged elevation view of the right side in operation mode at "sequence 4" with the drill #1 advanced into the prescribed drilling depth of the surface.
FIG. 10D is an enlarged top view of the turret in operation mode at "sequence 6" with the drill #2 in position of the target.
FIG. 10E is an enlarged elevation view of the right side in operation mode at "sequence 8.1" with the drill #2 and anchor advanced into the prescribed depth of the surface.
FIG. 10F is an enlarged top view of the turret in operation mode at "sequence 10" rotated back to the start position with the laser in position of the target.

FIG. 10A is an enlarged top view of the turret in operation mode in the turret start position with the laser in position of the target. FIG. 10B is an enlarged top view of the turret in operation mode at "sequence 2" with the drill #1 in position of the target. FIG. 10C is an enlarged elevation view of the right side in operation mode at "sequence 4" with the drill #1 advanced into the prescribed drilling depth of the surface. FIG. 10D is an enlarged top view of the turret in operation mode at "sequence 6" with the drill #2 in position of the target. FIG. 10E is an enlarged elevation view of the right side in operation mode at "sequence 8.1" with the drill #2 and anchor advanced into the prescribed depth of the surface. FIG. 10F is an enlarged top view of the turret in operation mode at "sequence 10" rotated back to the start position with the laser in position of the target. FIG. 11 is the operation mode block diagram of the operating sequence for the overhead drill and anchor press. The above described FIGS. 10A, B, C, D, E, and F can be referenced to FIG. 11 Operation mode block diagram.

The assembled embodiment of the overhead drill and anchor press is designed to be manually pushed or operated autonomously between target locations and sized to fit through standard framed door openings on a construction project. The onboard controller 130 is configured to operate the motorized omnidirectional wheels 2 upon directional input from the "Total Station" interface or remote input from the handheld controller by the operator. The Light Detection and Ranging "LIDAR" sensors 135 are arranged on all sides of the cart chassis 1 to provide feedback to the onboard controller 130. LIDAR sensors 135 determine distance between the chassis and obstructions or obstacles for the purpose of autonomously navigating about its environment. The embodiment is fitted with mounts for an adjustable height prism staff 132. These prism staff mounts 133 have been arranged to align the prism 131 in place of the laser 413 to the drilling position.

The prism 131 is a component of the "Total Station" and provides a means of tracking for determining its "X,Y,Z coordinates" with reference to the "BIM" model. The prism staff 132 is adjustable in height for the purpose of raising the prism higher than the turret assembly 4 to maintain line of sight to the "Total Station". When drilling holes and or installing anchors on a construction project all overhead utilities and building components need to coordinate. Laser 9 points up from the top of the prism to indicate the target location for further visual confirmation and approval by the operator.

The telescopic mast 3 is clamped vertically to the cart chassis 1. The telescopic mast is designed to lift the drill turret assembly 4 up to the work surface. To prevent the embodiment from possible tip over a 3-axis gyroscope 136 is arranged to monitor the vertical alignment of the mast and report back to the onboard controller 130. The onboard controller is configured to limit the height that the mast will be allowed to extend when the chassis is in an un-level position. FIG. 6 is an exploded view further illustrating the assembly of major components to the chassis.

Reference FIG. 7, the exploded view of the preferred embodiment of the turret assembly 4 to the overhead drill and anchor press. The dust collector assembly 450 is mounted to the turret carriage mounting bracket 704 of the turret assembly and configured to operate while the drill #1 430 is in operation. The drill carriers 432 have been designed in two segments: the carrier 432 and an isolation assembly. Two guide bolts 442 sleeved through isolation springs 441 connect the carrier to the drill. The isolation springs 441 allow for vertical movement that cushions against the reverberating action that drill #1 imposes on the carrier 432. The drill mounting is configured with a proximity sensor/switch 443 which is positioned within the drill housing. The proximity switch 443 monitors the vertical position of the drill to the carrier. As the springs compress, the vertical position between the drill and the carrier changes and the proximity switch 443 reports to the onboard controller 130 when it reaches the set point. The controller is coded to slow or pause the drive of the stepper motor 402 until the vertical distance spring returns past the set point. This configuration of drill mounting, carrier, springs, and proximity switch is arranged for the onboard controller to identify if the drill #1 is penetrating the surface and advancing or if an impenetrable obstruction exist at which time the controller will signal the operator and return to the "perched" position. The isolation of the vibrations from the hammer drill effects also act to prevent damage to the ball screws and stepper motor components. This embodiment of the turret assembly 4 and the dust collector 450 is secured to the Turret Carriage Mounting Bracket 704, which is hosted to the Mast Carrier Segment 706 referenced on FIG. 13B.

Figure 12:
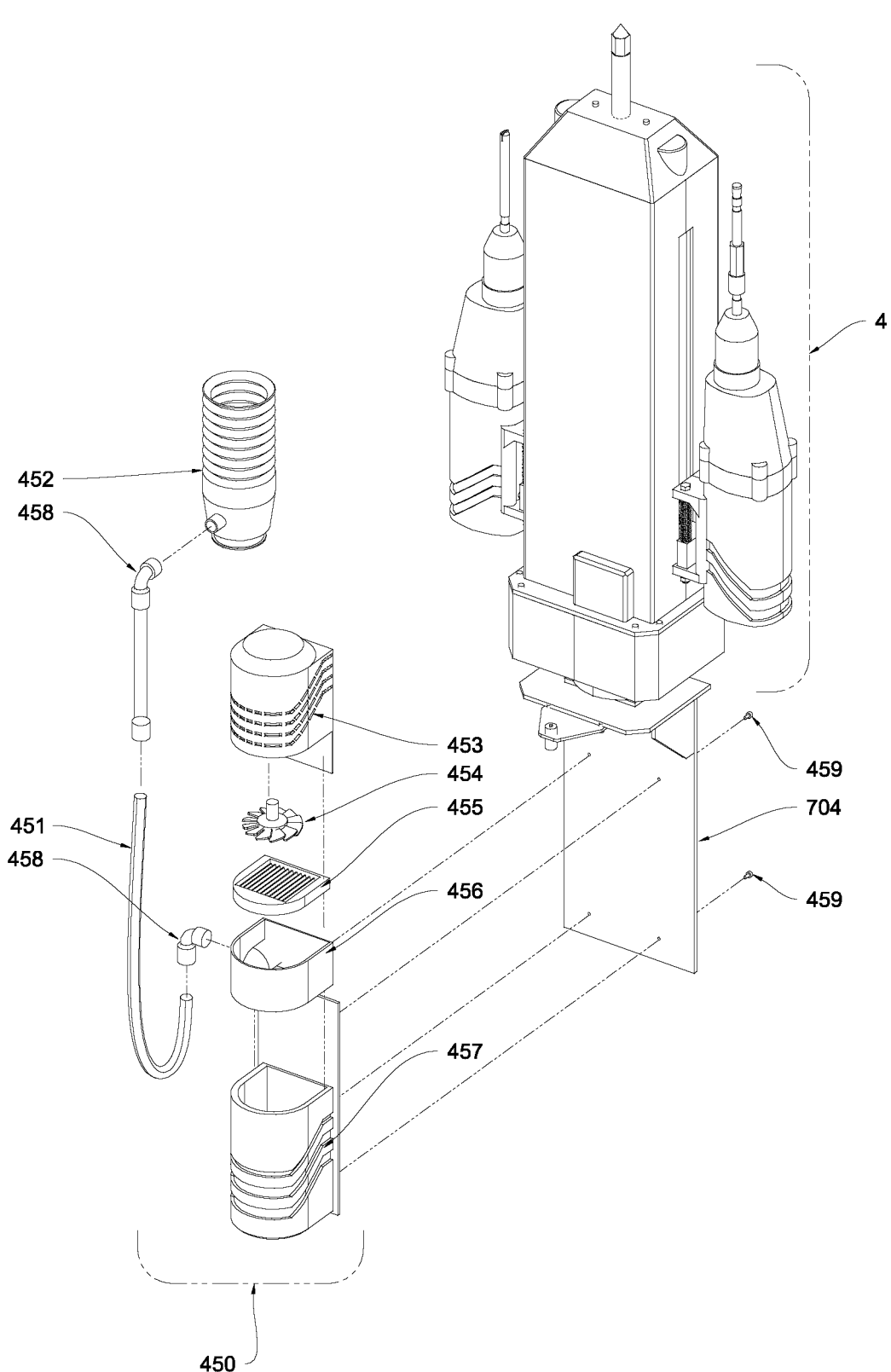
FIG. 12 is and exploded view of the preferred embodiment of the dust collector and reference to the mounting location on the turret.

FIG. 12 is an exploded view of the dust collector assembly 450. The dust collector is comprised of: an assembly housing exhaust port 453, a fan motor and fan blades 454, a filter 455, the intake port 456, the removable dust collector bucket 457, flexible tubing 451, tubing elbows 458, and a dust collector cup 452. The dust collector assembly is configured to operate while the drill #1 is drilling. The dust collector cup is a shroud that affixes to the top of drill #1 and is constructed of material designed to flex as the drill moves. The flexible cup 452 is configured to surround the drill bit and contain the dust while the vacuum pulls the dust into the dust collector bucket 457. The dust collector assembly 450 is also secured to the Turret Carriage Mounting Bracket 704 so that it travels within proximity of the drill #1. The flexible tubing is arranged to allow the vacuum to remain stationary while drill #1's position is manipulated by the turret assembly. The dust collector bucket is accessible by the operator when the mast is retracted, and the contents can be disposed as it reaches capacity.

Figure 13A:
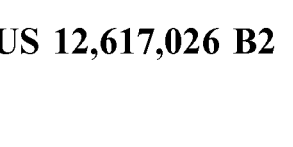
FIG. 13A is a side view of the-gear motor, motor mount, and cable drum attachment to the telescopic mast.
Figure 13B:
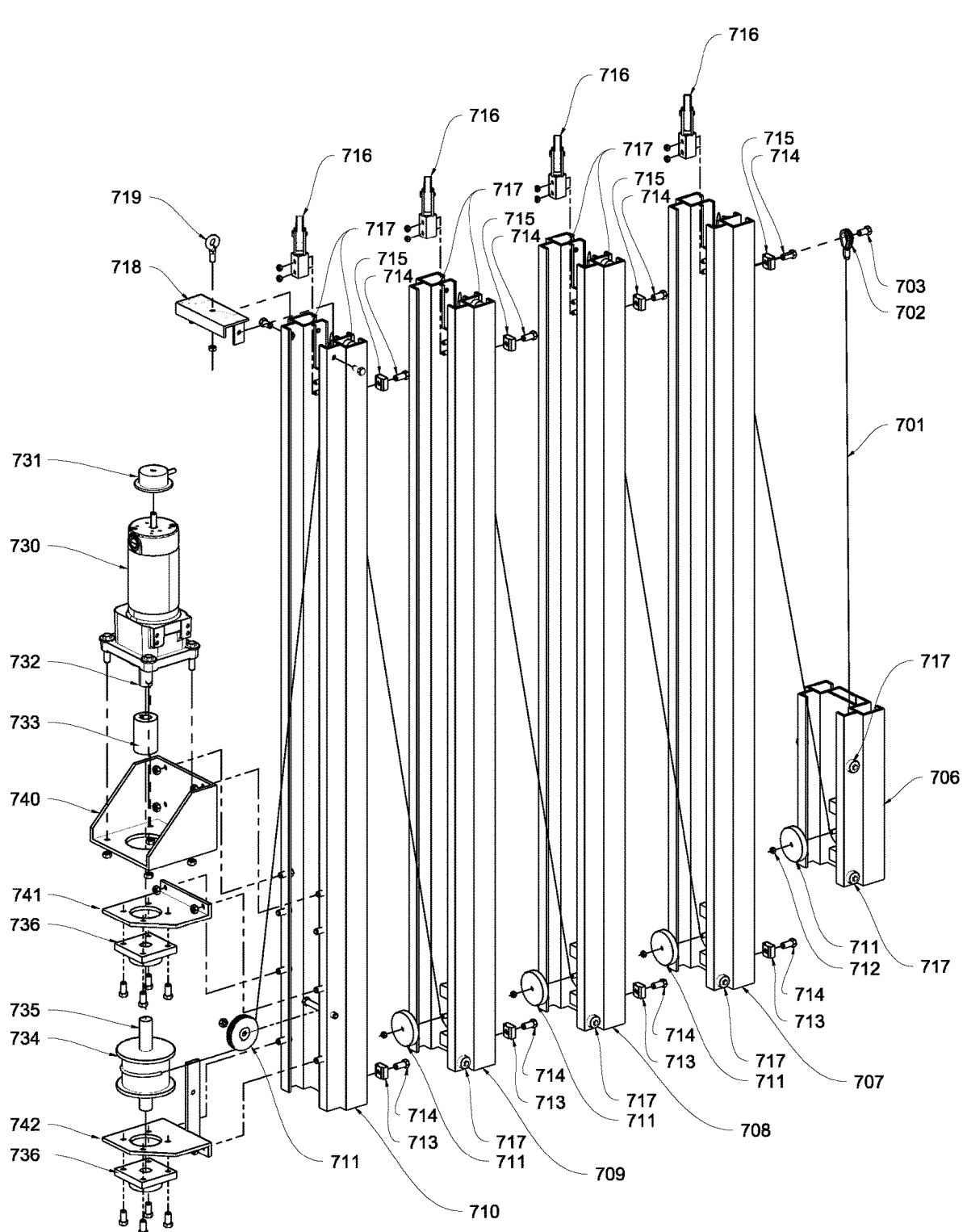
FIG. 13B is an exploded view of the assembly, referencing the mast segments, pulleys, and gear motor attachment.

FIG. 13A is a section view of the Telescopic Mast 3 in the perched, or retracted state. The mast gear motor 730 is mounted to the gear motor mount 740 and fixed to the lower section of the base mast segment #5 710. FIG. 13B is an exploded view of the telescopic mast 3 assembly. The Telescopic Mast Assembly 3 is comprised of: a Mast Carrier Segment 706, Mast Segment #2 707, Mast Segment #3 708, Mast Segment #4 709, Mast Base Segment #5 710, a Gear Motor 730, a gear motor break 731, a gear motor Shaft 732, a Cable Drum 734, a gear motor Mount 740, and a Cable 701. The gear motor shaft 732, is a keyed shaft and coupled 733 to the Cable Drum shaft 735. The cable drum 734 is keyed and fixed to the cable drum shaft 735. The cable drum shaft 735 secured by flanged bearings 736, on both sides and secured in place by the cable drum mount top 741 and cable drum mount bottom 742 which is also fixed to the lower portion of the base mast segment #5 710. The base mast segment #5 710 remains stationary fixed securely to the cart chassis framing 101.

The mast assembly 3 contains a cable 701 which is configured about each mast segment through a series of cable pulleys 711. One end of the cable 701 is secured to mast segment #2 707 routing around the pulley 711 of the mast carrier segment 706, then to the top pulley 716 and bottom pulley 711 of mast segment #2 707, then to the top pulley 716 and bottom pulley 711 of mast segment #3 708, then to the top pulley 716 and bottom pulley 711 of mast segment #4 709, then to the top pulley 716 and bottom pulley 711 of mast segment #5 710 ending at the cable drum 734. Each mast segment is configured with a stop block top 715 and a stop block bottom 713 to limit the extents of their movement and engage the next mast segment. The cable 701 is configured in this way so as the mast gear motor rotates it moves the mast segments 1 at a time starting with the mast carrier segment 706 when lifting and ending with the mast carrier segment when lowering. The mast assembly also comprises a proximity sensor/switch located near the top stop blocks and configured to report to the onboard controller 130 for adjustment to the speed of mast gear motor as it extends each segment. The mast gear motor is configured with a gear motor break 731. The gear motor break 731 is an electromagnetically operated spring-set break and configured to engage to lock the mast in place when the motor stops. Reference FIG. 7, the top of the turret assembly contains a pilot tip 423 and pilot shaft 426. The base of the pilot shaft 426 is flanged and upwardly restricted in place by the top mounting block 408 while pressed upward by the pilot spring 427. This pilot assembly on the turret is configured with a limit switch that closes when the pilot assembly is pressed. This limit switch identifies when the pilot tip 423 has contacted the construction surface above 10 and reports to the onboard controller telling the mast gear motor to stop driving the mast up and begin the next operation sequence. Upon completion of the drilling or drilling and anchor installation the mast gear motor 730 will control the speed at which the telescopic mast returns.

Figures 15A, 15B:
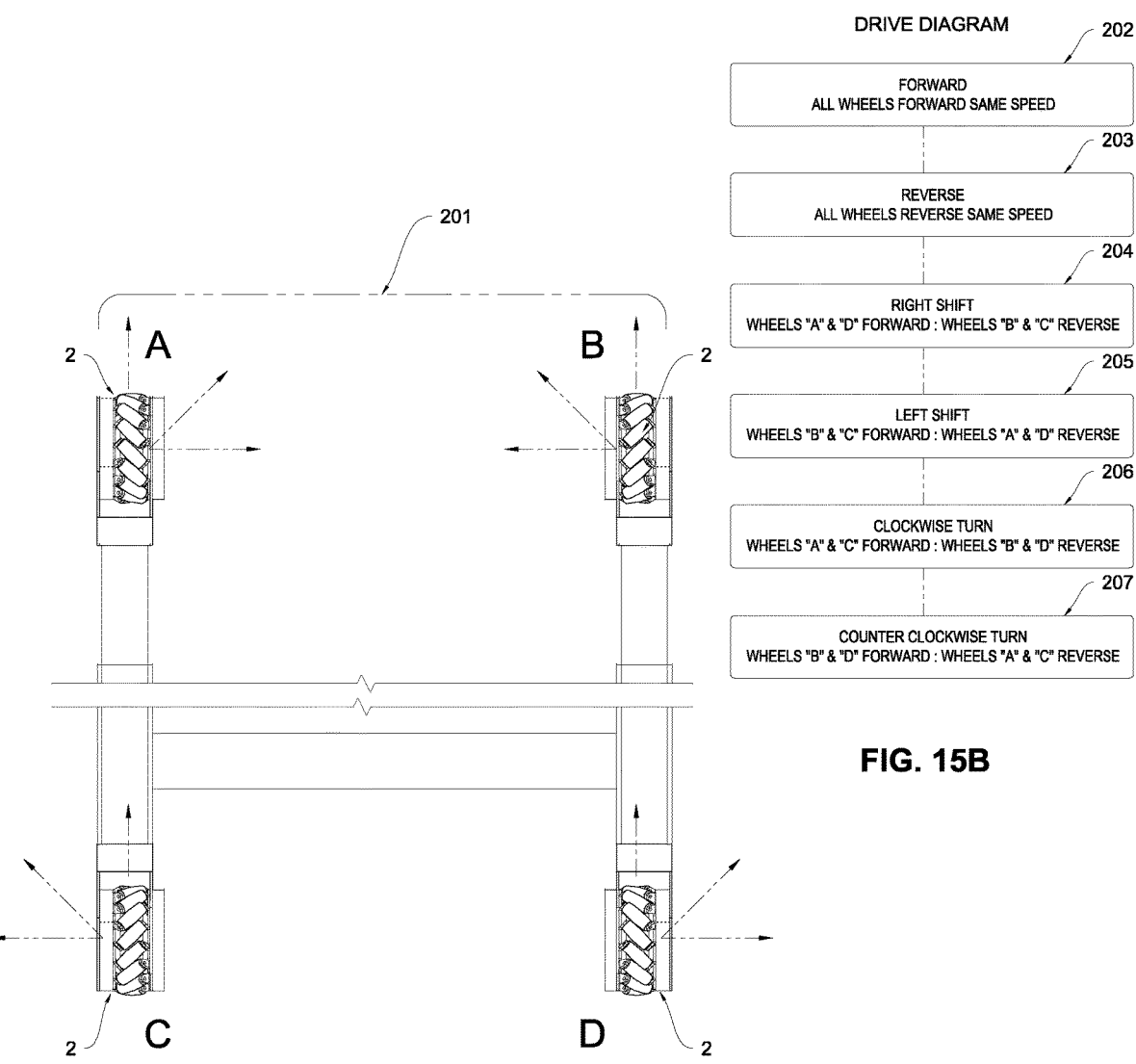
FIG. 15A shows the motorized omnidirectional wheels arrangement.
FIG. 15B is a drive diagram of the motorized wheel operation.

To maneuver the Overhead Drill and Anchor Press about the project has been designed with motorized omnidirectional wheels 2. Each motorized wheel is equipped with a motor arranged to drive the wheel in either direction and a range of speed for versatile maneuvering. The wheels are mounted to the chassis at a fixed position and can drive the embodiment in any direction. FIG. 15A shows the motorized omnidirectional wheels 2 arrangement with a name for each wheel referenced by the drive diagram.

FIG. 15B the drive diagram matrix showing direction of wheel rotation to achieve direction of movement. Forward movement is achieved by rotating all wheels forward at the same speed 202. The reverse is achieved by rotating all wheels backwards at the same speed 203. Right shift or moving the unit to the right is achieved by rotating wheels "A" and "D" forward and wheels "B" and "C" reverse 204. Left shift or moving the unit to the left is achieved by rotating wheels "B" and "C" forward and wheels "A" and "D" reverse 205. Rotating the unit clockwise is achieved by rotating wheels "A" and "C" forward and wheels "B" and "D" reverse 206. Rotating the unit counterclockwise is achieved by rotating wheels "B" and "D" forward and wheels "A" and "C" reverse 207.

Figure 14:
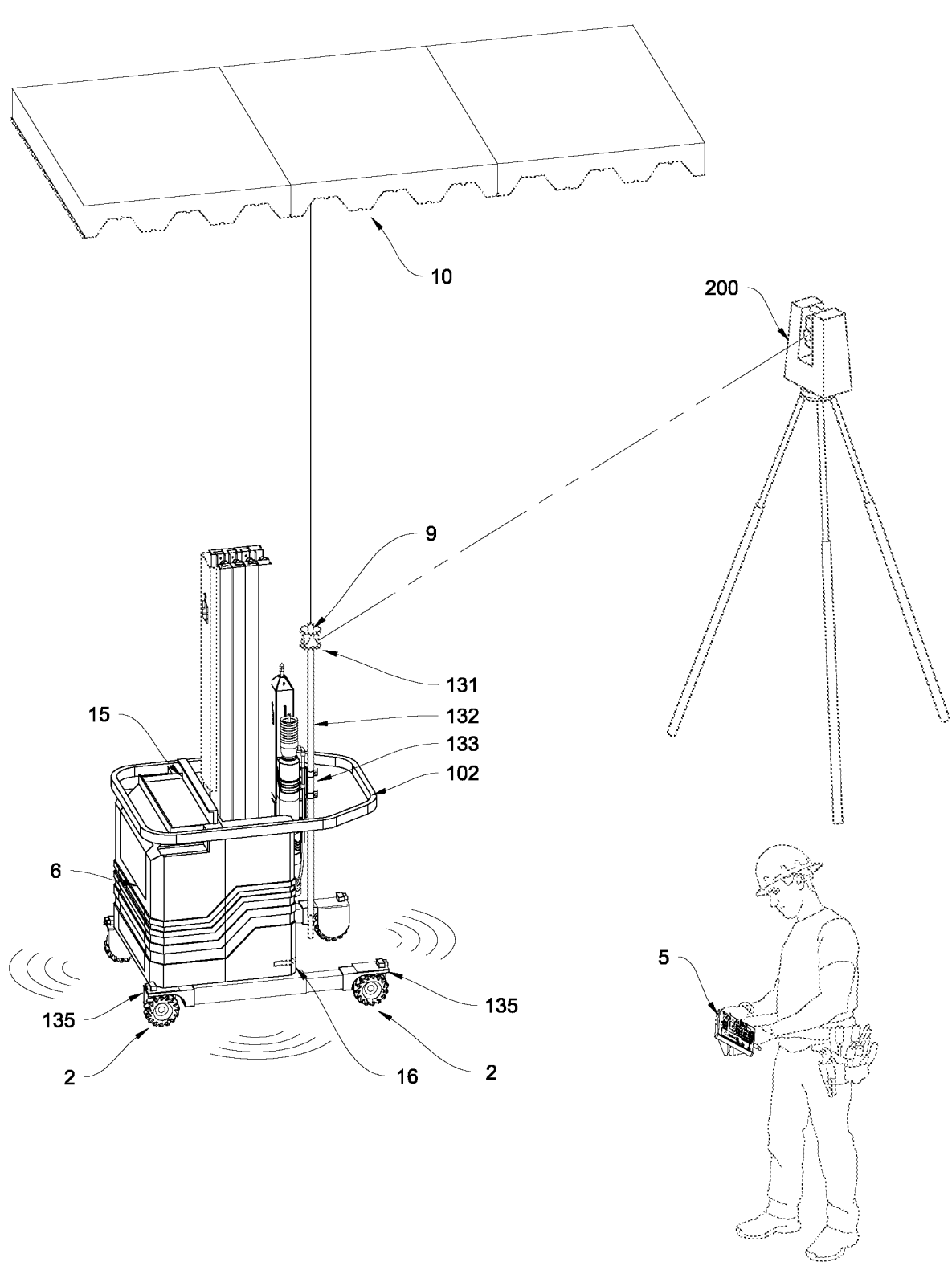
FIG. 14 Shows worker with the handheld controller, the "Total Station", as tracking the position of the prism mounted to the Overhead Drill and Anchor Press and the laser identifying its position overhead.

FIG. 14 Shows the "Total Station" (not part of this invention) tracking the position of the prism 21. The "Total Station" is generally set up by loading a "BIM" model image and the X,Y,Z coordinates of all point locations to be surveyed on the project. Once the "Total Station" is in place it's physical location with reference to the BIM model is identified by moving the prism above physical control points and synchronized with those control points within the BIM model. The "Total Station" then can direct northing and easting movements to align the prism to a layout point. The on-board controller of Overhead Drill and Anchor Press interfaced with "total Station" receiving the movement directions and utilizing the lidar sensors 135 to move into position to drill hole into the surface above. The operator uses handheld controller monitor the point layout process and can execute manual commands as needed.

It will be understood that the above-described arrangements of apparatus and the method there from are merely illustrative of applications of the principles of this invention and many other embodiments and modifications may be made without departing from the spirit and scope of the invention as defined in the claims.

What is claimed is:

1. An overhead drill and anchor press, comprising:
An onboard controller;
a cart chassis;
a mast connected to the cart chassis;
a motor connected to the mast which when activated by the onboard controller causes the mast to selectively move vertically between a down position and one of a plurality of raised positions;
a turret attached to the first portion of the mast;
a first drill connected to a first portion of the turret and a second drill connected to a second portion of the turret;
a first motor connected to the turret shaft which when activated by the onboard controller causes the turret and the first and second drills to selectively rotate between different rotational positions;
a second motor configured to move the first drill vertically between a lowered and a raised position;
a third motor configured to move the second drill vertically between a lowered and a raised position;
a plurality of wheels connected to the cart chasses; and
a plurality of sensors and switches configured to report measurement data to the onboard controller;
wherein the onboard controller is configured to control the mast to move the mast to position the turret adjacent to a surface to be drilled, to control the second motor to raise the first drill to a drilling position of the surface to be drilled, to control the first drill to drill a hole in the surface, to control the second motor to lower the first drill away from the surface,
further wherein the onboard controller is configured with a plurality of sensors, and switches, to control speed of movement of the mast and the pressure the drill exerts onto a drilling surface.

2. The overhead drill and anchor press of claim 1, further wherein the onboard controller is configured to control the first motor to rotate the turret to position the second drill below the drilled hole in the surface, to control the third motor to raise the second drill to the hole drilled in the surface, and to control the second drill to set an anchor in the drilled hole in the surface.

3. The overhead drill and anchor press of claim 1, wherein the onboard controller is configured suitably with an angular velocity sensor to control the height of travel of the mast.

4. The overhead drill and anchor press of claim 1, wherein the cart chassis further comprises a mount suitable for securely receiving a reflective prism.

5. The overhead drill and anchor press of claim 1, wherein the cart chassis wheels are motorized.

6. The overhead drill and anchor press of claim 1, wherein the onboard controller is configured to control the speed and direction of the motorized drive wheels.

7. The overhead drill and anchor press of claim 4 wherein the onboard controller is configured suitably with a sensor suitable for measuring distance, an angular velocity sensor, said sensors configurable to report measurement data to the onboard controller.

8. The overhead drill and anchor press of claim 1, wherein the onboard controller is configured suitably with a sensor suitable for measuring distance to maneuver the cart chassis to suitably control the motorized drive wheels so to avoid obstacles during movement.

9. The overhead drill and anchor press of claim 1, wherein the onboard controller is configured to access BIM files and layout application and is suitable for point layout navigation.

10. The overhead drill and anchor press of claim 1, further wherein the onboard controller is configured suitably with a human control interface.

11. An overhead drill and anchor press, comprising:
An onboard controller;
a cart chassis;
a mast connected to the cart chassis;
a motor connected to the mast which when activated by the onboard controller causes the mast to selectively move vertically between a down position and one of a plurality of raised positions;
a turret attached to the first portion of the mast;
a first drill connected to a first portion of the turret and a second drill connected to a second portion of the turret;
a first motor connected to the turret shaft which when activated by the onboard controller causes the turret and the first and second drills to selectively rotate between different rotational positions;
a second motor configured to move the first drill vertically between a lowered and a raised position;
a third motor configured to move the second drill vertically between a lowered and a raised position;
a plurality of wheels connected to the cart chasses; and
a plurality of sensors and switches configured to report measurement data to the onboard controller;
wherein the onboard controller is configured to control the mast to move the mast to position the turret adjacent to a surface to be drilled, to control the second motor to raise the first drill to a drilling position of the surface to be drilled, to control the first drill to drill a hole in the surface, to control the second motor to lower the first drill away from the surface,
further wherein the onboard controller is configured with a plurality of sensors, and switches, to control speed of movement of the mast and the pressure the drill exerts onto a drilling surface;
and
wherein a dust collection assembly is mounted on the turret assembly and configured to operate while the drill is active.

12. The overhead drill and anchor press of claim 11, wherein the dust collection assembly further comprises a flexible shroud arranged proximate to the drill bit and a flexible tube for collection and containment of dust.

13. The overhead drill and anchor press of claim 12, further wherein the onboard controller is configured to control the first motor to rotate the turret to position the second drill below to drilled hole in the surface, to control the third motor to raise the second drill to the hole drill in the surface, and to control the second drill to set the anchor in the drilled hole in the surface.

14. An overhead drill and anchor press, comprising:

An onboard controller;

a cart chassis;

a mast connected to the cart chassis;

a motor connected to the mast which when activated by the onboard controller causes the mast to selectively move vertically between a down position and one of a plurality of raised positions;

a turret attached to the first portion of the mast;

a first drill connected to a first portion of the turret and a second drill connected to a second portion of the turret;

a first motor connected to the turret shaft which when activated by the onboard controller causes the turret and the first and second drills to selectively rotate between different rotational positions;

a second motor configured to move the first drill vertically between a lowered and a raised position;

a third motor configured to move the second drill vertically between a lowered and a raised position;

a plurality of wheels connected to the cart chasses; and a plurality of sensors and switches configured to report measurement data to the onboard controller;

wherein the onboard controller is configured to control the mast to move the mast to position the turret adjacent to a surface to be drilled, to control the second motor to raise the first drill to a drilling position of the surface to be drilled, to control the first drill to drill a hole in the surface, to control the second motor to lower the first drill away from the surface, further wherein the onboard controller is configured with a plurality of sensors, and switches, to control speed of movement of the mast and the pressure the drill exerts onto a drilling surface;

and further comprising a plurality of mast segments, a plurality of pulleys, a cable, a cable drum, and a mast motor assembly.

15. The overhead drill and anchor press of claim 14, wherein the mast assembly is operably configured to move the mast segments 1 segment at a time.

16. The overhead drill and anchor press of claim 15, further comprises a sensor wherein the sensor is configured with the onboard controller to control the speed of the mast.

17. The overhead drill and anchor press of claim 16, wherein the mast motor further comprises a break configured to lock the mast in position when mast motor is not in motion.

18. The overhead drill and anchor press of claim 17, further wherein the onboard controller is configured to control the first motor to rotate the turret to position the second drill below the drilled hole in the surface, to control the third motor to raise the second drill to the hole drilled in the surface, and to control the second drill to set an anchor in the drilled hole in the surface.

* * * * *